(12) United States Patent
Scherer et al.

(10) Patent No.: US 10,084,195 B2
(45) Date of Patent: Sep. 25, 2018

(54) METHOD FOR THE PRODUCTION OF A WATER TRANSFER COMPOUND

(71) Applicant: REINZ-DICHTUNGS-GMBH, Neu-Ulm (DE)

(72) Inventors: Joachim Scherer, Ulm (DE); Rainer Glueck, Dornstadt (DE); Thomas Stoehr, Laupheim (DE); Werner Buntz, Muehlhausen i.T. (DE); Manfred Bruehl, Kuchen (DE)

(73) Assignee: Reinz-Dichtungs GmbH, Neu-Ulm (DE)

( * ) Notice: Subject to any disclaimer, the term of this patent is extended or adjusted under 35 U.S.C. 154(b) by 302 days.

(21) Appl. No.: 14/392,092

(22) Filed: Oct. 5, 2015

(65) Prior Publication Data

US 2016/0056483 A1    Feb. 25, 2016

Related U.S. Application Data

(63) Continuation of application No. PCT/EP2014/056806, filed on Apr. 4, 2014.

(30) Foreign Application Priority Data

Apr. 9, 2013 (DE) .................. 20 2013 003 566 U

(51) Int. Cl.
| | |
|---|---|
| *H01M 8/04* | (2016.01) |
| *B32B 37/18* | (2006.01) |
| *B32B 37/20* | (2006.01) |
| *H01M 8/04119* | (2016.01) |
| *B32B 38/00* | (2006.01) |

(52) U.S. Cl.
CPC ....... *H01M 8/04149* (2013.01); *B32B 37/185* (2013.01); *B32B 37/206* (2013.01); *B32B 38/0004* (2013.01); *H01M 8/04141* (2013.01); *Y10T 156/1062* (2015.01); *Y10T 156/1085* (2015.01)

(58) Field of Classification Search
CPC . B32B 37/185; B32B 37/206; B32B 38/0004; H01M 8/04149; H01M 8/04141
See application file for complete search history.

(56) References Cited

U.S. PATENT DOCUMENTS

| | | | |
|---|---|---|---|
| 7,404,848 B2 | 7/2008 | Okada et al. | |
| 8,669,019 B2 | 3/2014 | Guzda | |
| 8,709,199 B2 | 4/2014 | Brenner et al. | |
| 2004/0013929 A1 | 1/2004 | Hsu et al. | |
| 2006/0021615 A1* | 2/2006 | Kertzman | A61M 16/1045 128/201.13 |
| 2011/0294032 A1* | 12/2011 | Guzda | H01M 8/04141 429/479 |

FOREIGN PATENT DOCUMENTS

| | | | |
|---|---|---|---|
| DE | 102005037485 A1 | 6/2006 | |
| DE | 102011102234 A1 | 12/2011 | |
| DE | 202011109654 * | 1/2013 | .......... H01M 8/0263 |
| DE | 102012215657 A1 | 3/2013 | |
| EP | 1526597 A1 | 4/2005 | |

OTHER PUBLICATIONS

European Patent Office; International Search Report; dated Jun. 17, 2014; European Patent Office, Rijswijk, Netherlands.
German Patent and Trademark Office; German Search Report; dated Nov. 12, 2013; German Patent and Trademark Office, Munich, Germany.

* cited by examiner

*Primary Examiner* — Linda L Gray
(74) *Attorney, Agent, or Firm* — Marshall & Melhorn, LLC

(57) ABSTRACT

The application relates to a water transfer compound, preferably for use for the humidification of process gases for fuel cells, comprising:—a water-permeable and essentially gas-impermeable water transfer layer as well as—at least one thermoplastic protection layer which is water- and gas-permeable at least in sections, where—the water transfer layer and the thermoplastic protection layer overlap each other at least in sections and comprise a first and a second overlapping area, where—the water transfer layer in the first overlapping area is accessible for humid gases through the thermoplastic protection layer and the water transfer compound is thermocompressed in the second overlapping area so that the water transfer layer in the second overlapping area is not accessible for humid gases through the compressed thermoplastic protection layer.

11 Claims, 17 Drawing Sheets

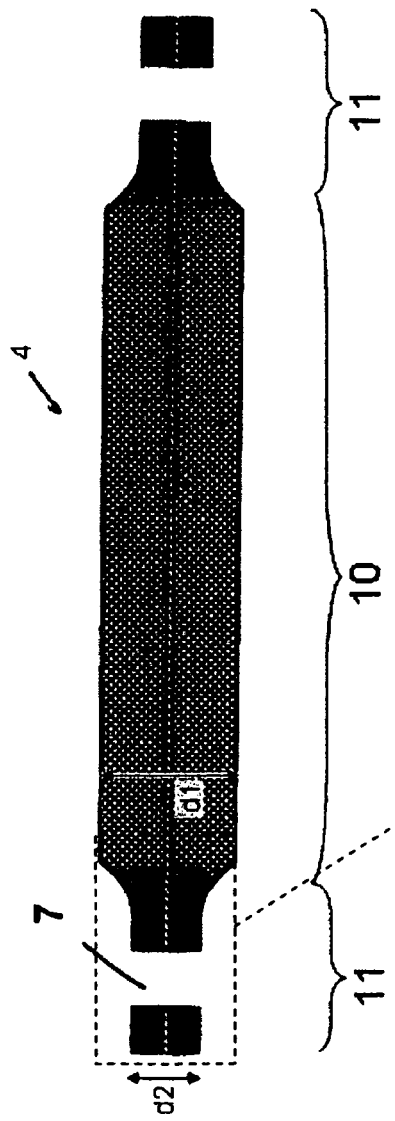
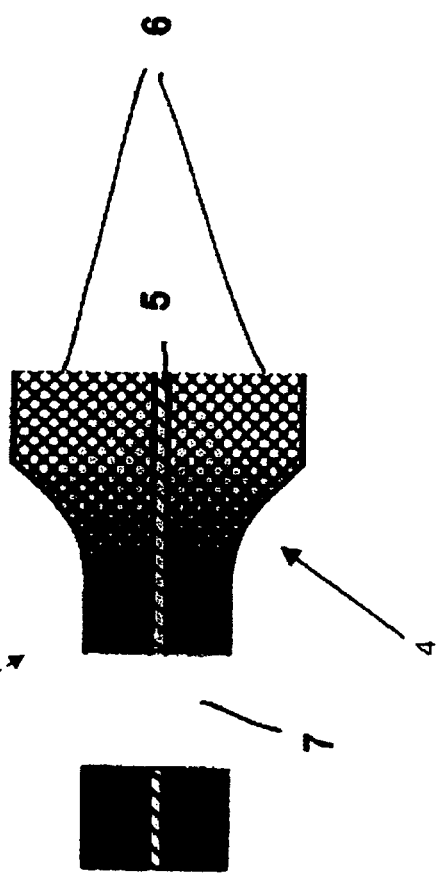

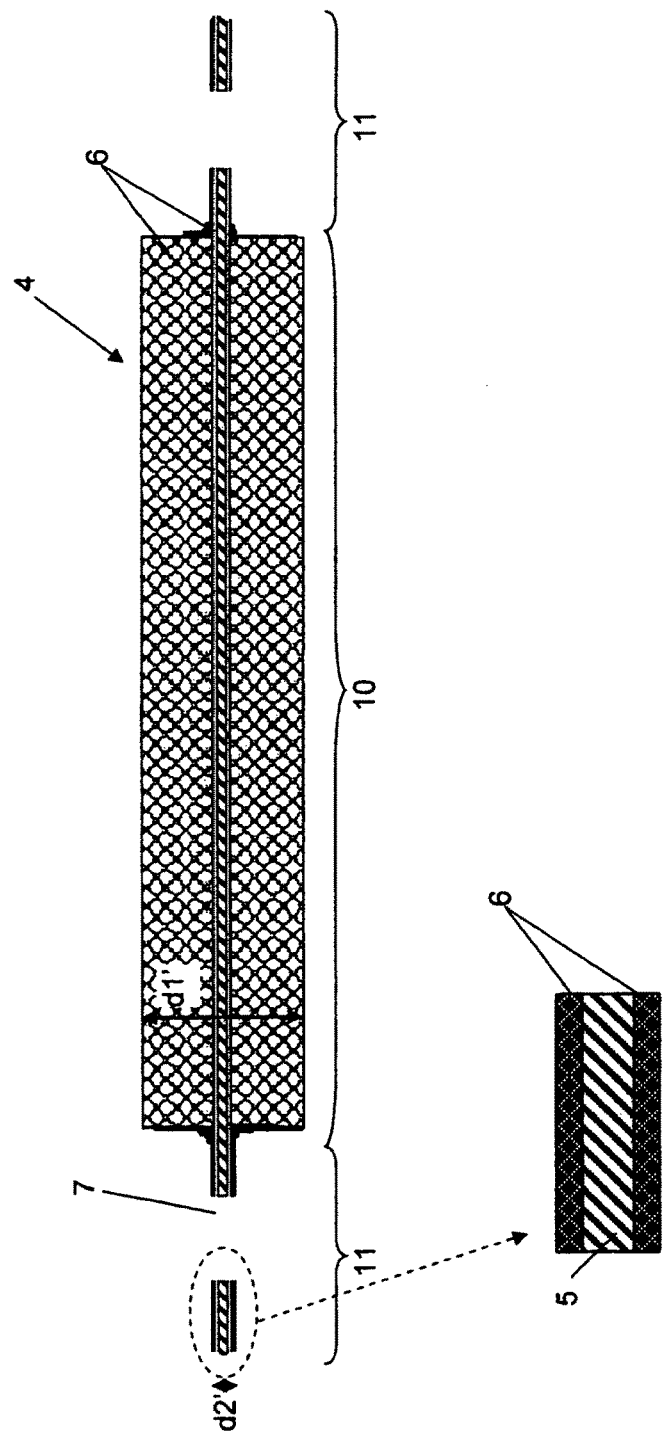

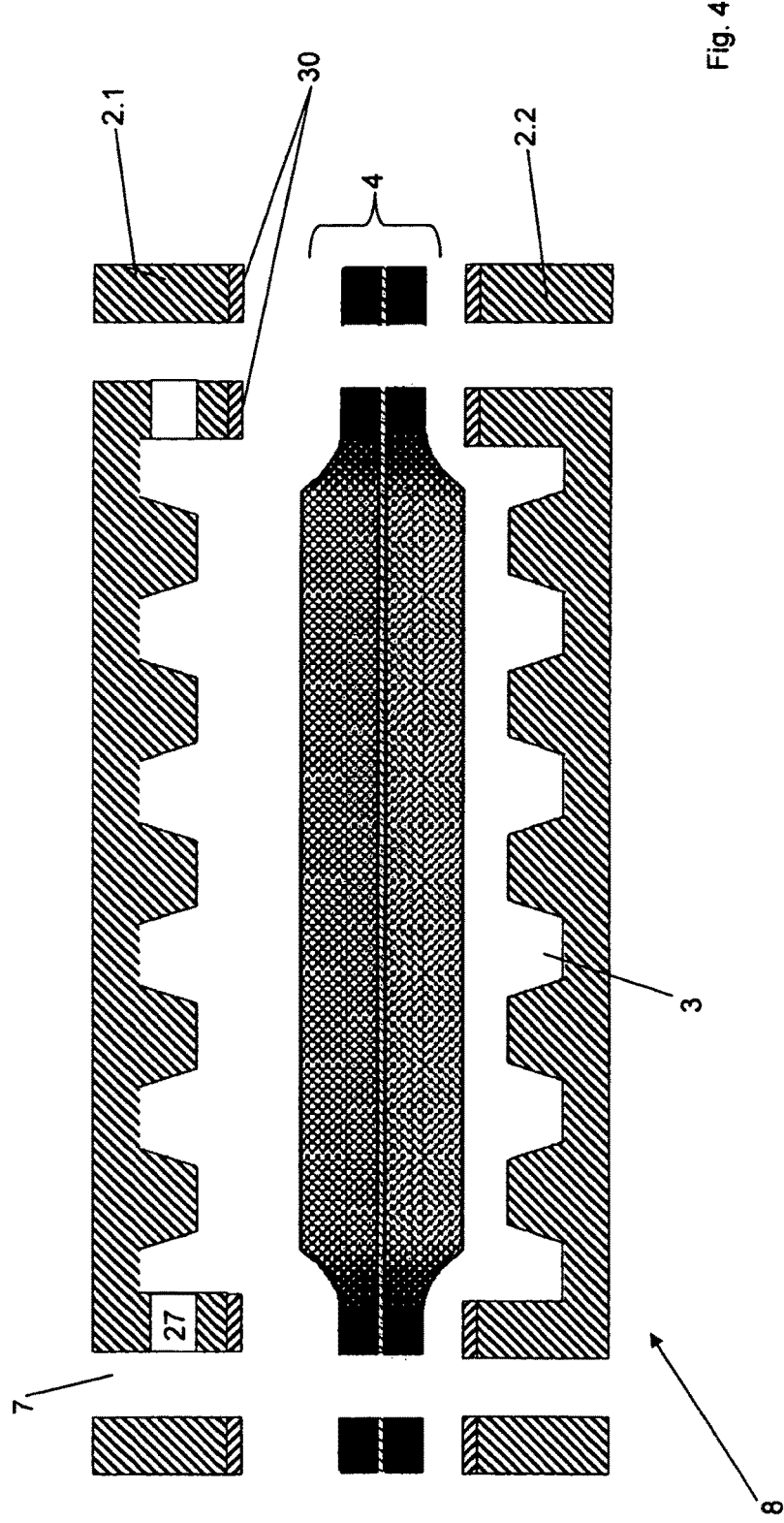

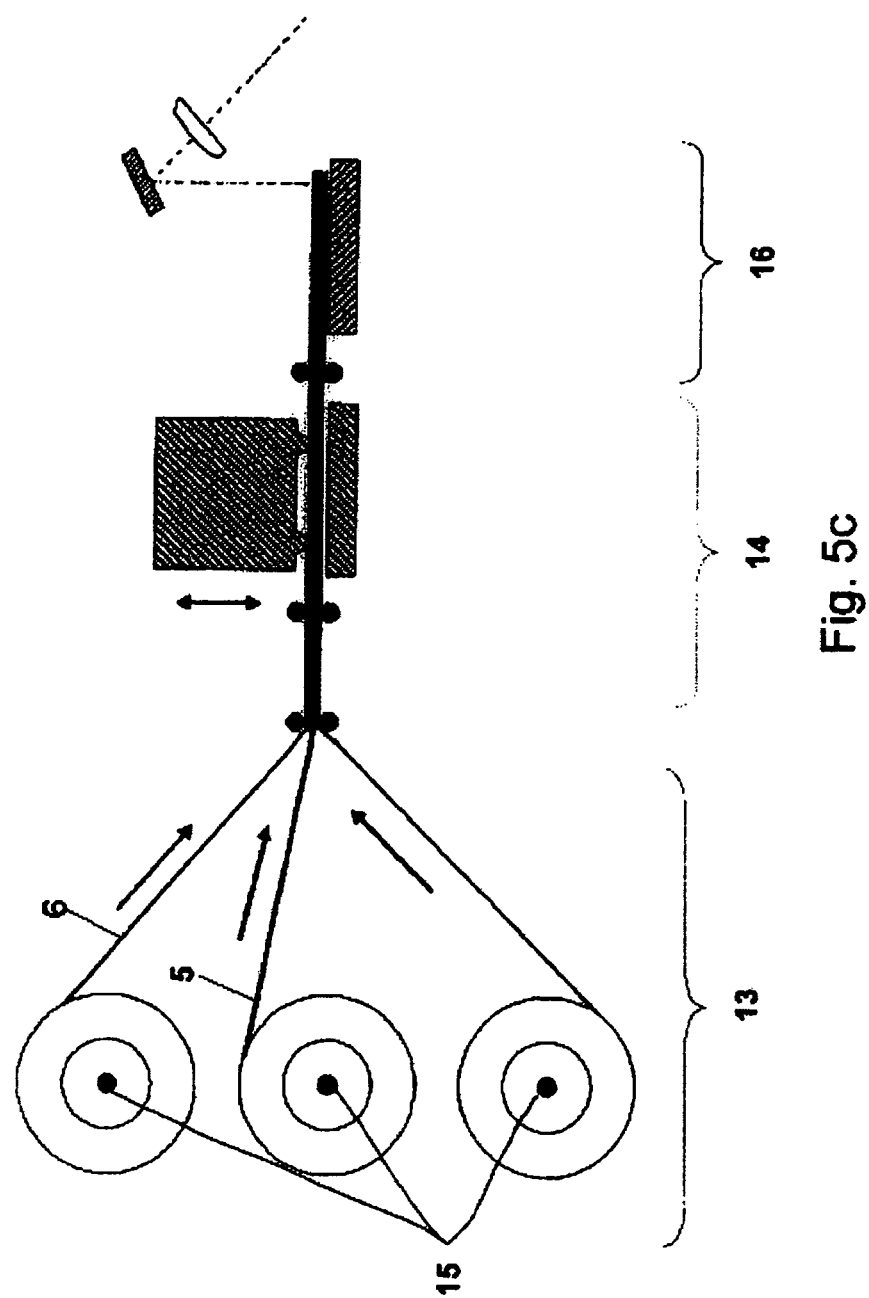

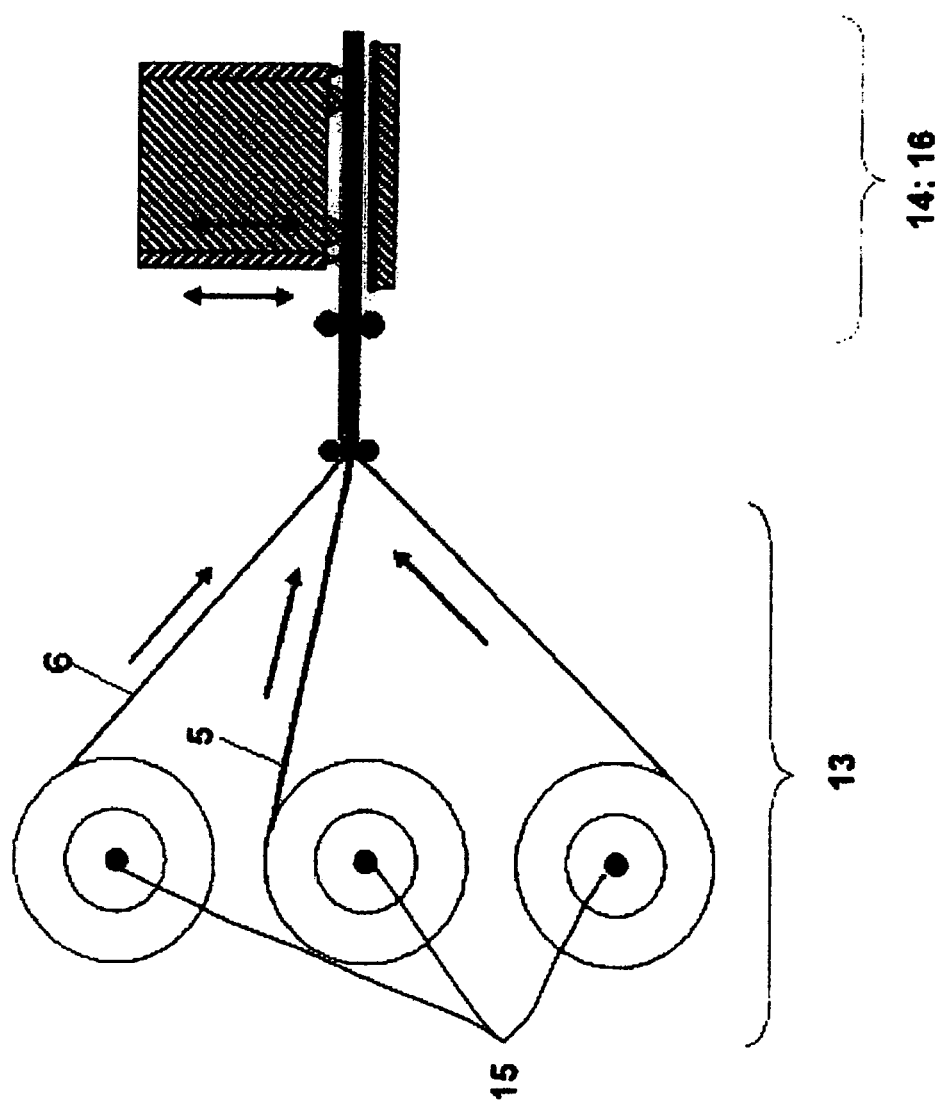

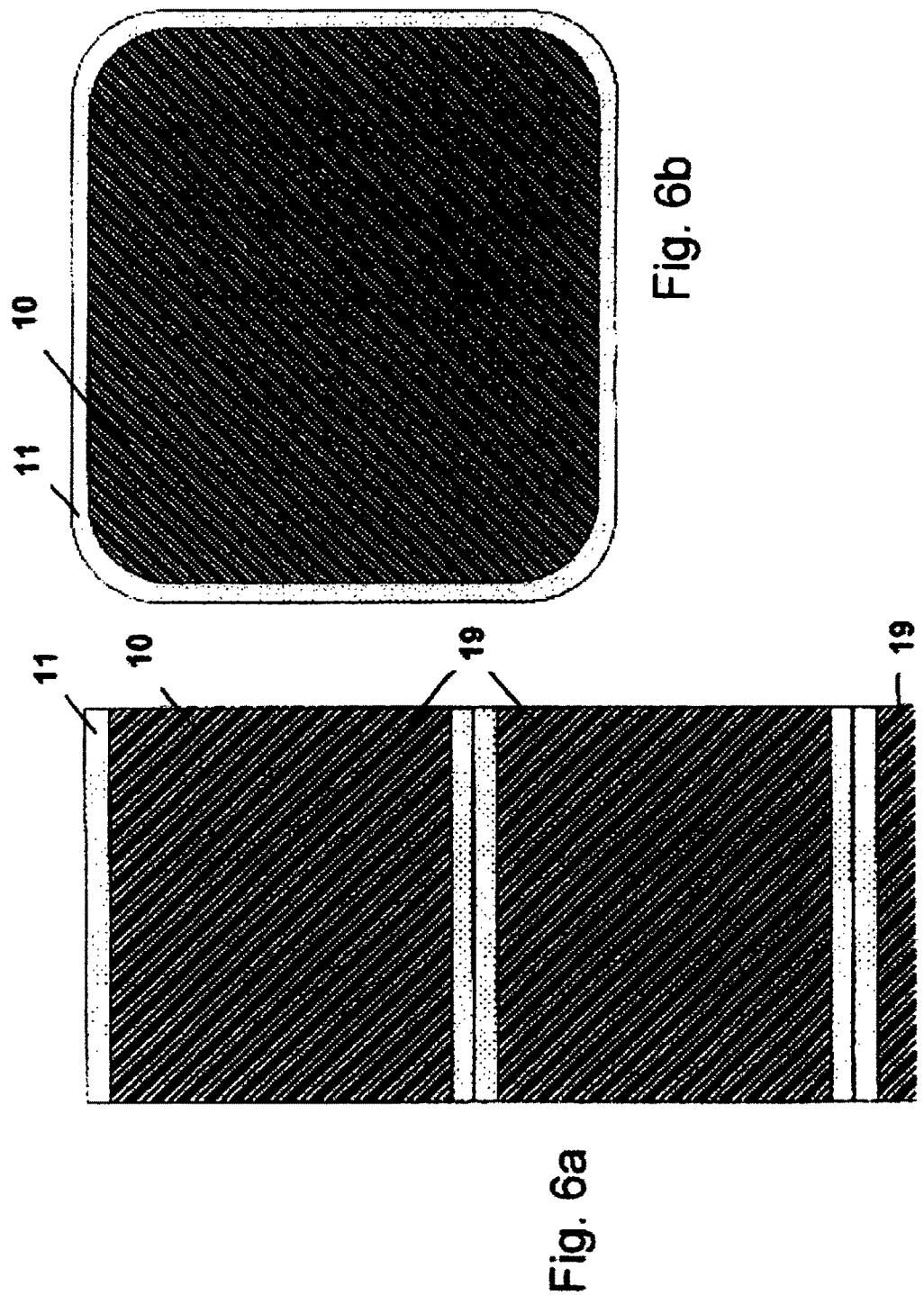

METHOD FOR THE PRODUCTION OF A WATER TRANSFER COMPOUND

BACKGROUND OF THE INVENTION

The present invention relates to a water transfer compound, a humidifier module, a humidifier as well as a device for the production of a water transfer compound. The water transfer compound can preferably be used for the humidification of process gases for fuel cells.

Fuel cells among others use gaseous process media, such as molecular hydrogen and oxygen for producing electrical current.

Such fuel cells usually use polymer-electrolyte membranes (PEM). During operation, such a PEM heats up to 80 or 90° C. It is important for the degree of efficiency of a fuel cell as well as for the durability of the PEM that relatively stationary conditions are given in the area of the PEM both with respect to temperature and humidity. In particular, drying-out of the PEM can have a negative impact on the durability and the degree of efficiency of the fuel cell.

For a purposeful setting of the degree of humidity of the process gases fed to the fuel cell, it is therefore usual to humidify particular process gases before they are fed to the fuel cell. To this end, humidifiers are known in which a water-permeable membrane is arranged between two flow plates comprising flow channels. This water-permeable membrane or water transfer layer separates a dry gas stream which is to be humidified on its one side and a gas stream which needs to be dehumidified on its other side.

As the water-permeable membrane, at least with a minimum humidification is essentially gas-tight, an approximation of the water content in both gases is achieved but a mixture of the gases themselves is prevented. It is however disadvantageous that known humidifiers are very expensive in their production and that tolerances for production and mounting have to be followed very closely in order to guarantee the desired humidity exchange.

Both components used to this end as they are used in the state of the art, in particular the water-permeable membrane, thus the water-transferring layer, are extremely thin and therefore limp, which causes a particular difficulty. If thermoplastic protective layers are used for the protection of these fragile membranes, their porosity impedes a grasping and positioning using the vacuum gripping systems usually used in automatized processes. Due to this, positioning procedures become very complex and even with the slightest imprecision leakages can occur, e.g. caused by folded or wrongly inserted membranes.

BRIEF SUMMARY OF THE INVENTION

It is therefore the purpose of the present invention to provide for a water transfer compound, a humidifier module, a humidifier and a device as well as a method for the production of these, respectively, where the corresponding products can be produced on a large scale and which are cost-efficient given their clever design, so that the humidifiers and the fuel cell systems connected to them, respectively, can be operated flawlessly.

This purpose is achieved by the objects of the independent claims.

To begin with, this is a water-transfer compound, in particular for the use for the humidification of process gases for fuel cells, comprising:

a water-permeable and essentially gas-tight water transfer layer as well as at least one thermoplastic protection layer, where the water transfer layer and the thermoplastic protection layer overlap with each other at least in sections and comprise a first and a second overlapping area, with the water-transfer compound being water-permeable in the first overlapping area and thermocompressed and therefore water and gas tight in the second overlapping area.

Prior to joining, the water transfer layer as well as the thermoplastic protection layer or layers, respectively, are arranged so that they overlap at least partially. This does however not mean that these need to have congruent outer edges. Here, it is only required that an overlap is present at all.

This overlap according to the invention has two areas, a first and a second overlapping area.

In this respect, it is important that in the first overlapping area, a passage of humidity or humid gases through the thermoplastic protection layer is possible. This means that the thermoplastic protection layer as it is given in the water transfer compound at least in sections needs to be water and gas permeable in order to allow a realization of the invention.

In the second overlapping area, which is thermocompressed, the thermoplastic protection layer is compressed in such a way that it is non-permeable for gases, especially humid gases, and therefore the water transfer layer situated subjacent the thermoplastic protection layer is not accessible for humid gases. This means that in the second overlapping area, the thermoplastic protection layer compressed as described is impermeable for water and gases, preferably both in the direction of its plane as well as transversely to the direction of its plane. In general, the subjacent water transfer layer on its entire face is at least not permeable for gases, but permeable for liquids. This is especially true transversely to the face.

During thermocompression, a hot roll or stamp is applied to the areas to be connected using pressure. For the water transfer compound according to the invention, typical pressures used are 0.1 to 5 MPa, preferably 0.8 to 2 MPa with typical temperatures of 150° to 300° C., preferably 220 to 270° C. The exact conditions to be used will also depend on the particular material used.

Advantageous variants of the invention are described in the other claims.

An advantageous variant provides that thermoplastic protection layers are provided on both sides of the water transfer layer. This allows an exceptional protection of the water transfer layer as the latter with this means is protected on both sides. It shall however be emphasized that this three-layered arrangement is not compulsive for the invention; two-layered arrangements as well as arrangements with further layers or additional intermediate layers, respectively, are also covered by the invention.

An advantageous variant provides that the second overlapping area shows a reduced thickness compared to the first overlapping area.

The smallest thickness is here accepted to be the thickness of the second overlapping area as one can assume that this area is impermeable for humid gas. The thickness of the first overlapping area is adopted as the largest thickness of the first overlapping area. For technical reasons, various variants of the layer thickness will be given in a transition area in which the thickness increases steadily from the second overlapping area to the first overlapping area. In this transition area, humid gas can still permeate at least to some extent. However, this transition area in the present description is considered to be part of the first overlapping area.

A further embodiment provides that the second overlapping area delimits the first overlapping area at least at two longitudinal edges of the first overlapping area. This is particularly advantageous if an assembly of coil-material is realized in order to obtain a continuous water transfer compound. In this case a separation of individual segments can then be realized, e.g. transversely to the longitudinal edges of the coil.

It is however also possible that the second overlapping area delimits the first overlapping area circumferentially. This way, a lateral sealing of the so-called active area of the water-transfer compound can also be achieved in an easier way.

An advantageous variant provides that the thickness in the first overlapping area amounts to between 35 and 600 μm and that the thickness in the second overlapping area corresponds to 10 to 75%, preferably to 20 to 50% of the thickness of the first overlapping area. The thickness strongly depends on whether only one or two thermoplastic protective layers are present. The thickness of an individual thermoplastic protective layer in the first overlapping area in general corresponds to between 30 and 250 μm, preferably between 80 and 110 μm. The thickness of the water transfer layer in the first overlapping area generally corresponds to between 8 and 30 μm, preferably between 15 and 30 μm.

An advantageous variant provides that the thermoplastic protection layer in the first overlapping area is porous and has a porosity of preferably 50 to 95%.

The porosity here allows for a diffusion of humid gases through the thermoplastic protection layer to the water transfer layer. The porosity is here considered in the area of the thermoplastic protection layer which has neither been thermally nor mechanically influenced by thermocompression; thus, not in the transition area towards the second overlapping area. A further advantageous embodiment provides that the thermoplastic protection layer in the second overlapping area is essentially non-porous, thus the density of the thermoplastic protection layer in this area is higher than in the above-mentioned porous area of the first overlapping area.

An embodiment provides that in the second overlapping area, openings are cut out, punched out or introduced by laser. This relates to so-called inner areas which are entirely surrounded by the second overlapping area. It is however also possible—either alternatively or additionally—that the outer edges of the water transfer compound at least in sections in or at the second overlapping area are cut out, punched out or reshaped by laser.

In a preferred embodiment, the water-transfer layer is realized as a non-reinforced membrane, which can rest on a support medium. Analogously to the protection layer, thermoplastic fiber papers, fiber rovings, fleece or fiber weave with polymeric fibers can be used. In an alternative advantageous embodiment, the water transfer layer is realized as a reinforced membrane.

An embodiment provides that the thermoplastic protective layer comprises polyester, polypropylene, polyethylene, polyvinylidene fluoride, polytetrafluorethylene, polyphtalamide, polyethylene terephthalate and/or polybutylene terephthalate or consists of such. This means that the materials mentioned can be used in the pure form. However, thermoplastic protective layers can also be made from a layering of these materials or comprise a mixture of these materials.

An embodiment provides that the water transfer layer is realized as a porous medium, as a coated and/or impregnated weave (Texapore®, Venturi®), as a membrane laminate (Goretex®), as a membrane impregnated with ionomers, as a polymer electrolyte membrane (Nafion®), as a hydrophilic membrane or as a diaphragm. These materials are commercially available, but generally very easily damaged. Therefore, the invention is useful for the protection of these water transfer layers. The impregnations mentioned in this context are impregnations which amend the properties of the water transfer layer. The impregnations are applied to the full area of the water transfer layer. They do not relate to any kind of impregnation locally applied to the outer edges of a ready-made water transfer compound; such impregnations are used in the state of the art in order to improve leak tightness of compounds towards the outside.

The invention further relates to a humidifier module, in particular for the humidification of process gases of fuel cells, which comprise at least a first as well as a second flow plate as well as a water transfer compound as described above arranged between the first and second flow plate, where the first and second flow plate each comprise channel structures for the guidance of gases.

An advantageous variant to this provides that the water transfer compound in its second overlapping area at least in sections is adhesively bonded to a first and/or second flow plate. This way, sealing of the humidifier module can be ascertained. Moreover, this arrangement is even less sensitive against mechanical stress and bending, respectively, compared to the unprotected water transfer compound mentioned beforehand. In this context, it is advantageous that the adhesive connection is arranged at least in sections in the outer edge area of the water transfer compound and/or of the first and/or second flow plate. Gluing, melting, welding and in particular ultra-sonic welding lend themselves for this connection between flow plates and the water transfer compound.

An alternative embodiment provides that the first and/or second flow plate comprise a sealing area which surrounds the channel structures. Here, the water transfer compound is connected in a force fit manner to the first and/or second flow plate by placing it on the sealing area.

In another alternative preferred embodiment, the first and the second flow plate again show a sealing area surrounding the channel structures. Here, structures are incorporated in both flow plates which are at least in part complementary to each other, e.g. comparable to a tongue and groove connection. The flow plates can be connected to each other using these complementary structures. Leak tightness can be achieved by clamping the water transfer compound between the complementary structures. It is preferred that the compressed, second overlapping area is clamped between these structures. The connection is realized as a positive fit and force fit. In order to obtain an optimal sealing, the complementary structures are designed such that the shapes do only optimally fit once the water transfer compound has been received.

It is advantageous that the first and/or second flow plate of a humidifier module comprise openings for the guidance of media in the direction of the stack, which openings overlap at least in sections with the openings in the second overlapping area of the water transfer compound. With this, a secure and tight guidance of media, in particular of gases, is achieved in the direction of the stack.

As an alternative, it can also be advantageous if the first and/or second flow plate comprise openings for the guidance of media in the stack direction but that all these openings for media guidance are arranged outside that section of the respective flow plate which is covered by the water transfer compound. In this alternative embodiment, the outer contour of the water transfer compound is smaller than in the preceding embodiment, thus it allows saving material.

An advantageous variant provides that the flow plates at least in sections are produced from thermoplastic, elastomeric or thermoset plastics and/or consist at least in sections in corrosion-stable metallic material.

An embodiment provides that the first overlapping area of the water transfer compound at least in sections overlaps with the channel structures of the first and second flow plate. With this, it is ascertained that the humidity passing through the water transfer layer is guided to the desired channels and that in their further pathway they reach the corresponding outlets of the humidifier module.

An embodiment provides that the first and second flow plate are different from each other in at least one of choice of material, form of channels, direction of channels and sealing contour. This can be advantageous as the guidance of media can be easily realized through a predetermined course of different flow plates. It shall however explicitly not be excluded for the structures of the flow plates to be identical.

However, a variant can be advantageous in which flow plates with geometry A and flow plates with geometry B are given and in which the layering of flow plates has the sequence A-B-A-B etc. With a layering sequence A-B-A-B it is advantageous if on both sides of plate A, humid gas flows into the channel structure in order to be humidified and that on both sides of plate B, humid gas enters into the flow channels. Then, it is preferable that one water transfer compound is arranged between all flow plates.

The invention also relates to a humidifier, in particular for the humidification of process gas for fuel cells, comprising:
a first inlet for feeding dry gases as well as a first outlet for releasing humidified gases, and
a second inlet for feeding humid gases as well as a second outlet for releasing dehumidified gases,
at least one humidifier module as described above, where the channel structures of the humidifier module are connected to at least one of the above-mentioned inlets or outlets, respectively.

Such a humidifier is advantageously connectible to a fuel cell system. This way, a humidifier can be provided which is producible cost-efficiently and at large scale, which humidifier provides fuel cell systems with process gases humidified to the degree required.

The invention in addition relates to a device for the production of a water transfer compound, of a humidifier module and/or of a humidifier, comprising:
an arrangement for a continuous or discontinuous supply of a water transfer layer and at least one porous thermoplastic protection layer, as well as
an arrangement for an at least sectional thermocompression of the water transfer layer and of the at least one thermoplastic protection layer, with the thermocompression being realized in such a manner that the compressed areas are water and gas tight.

According to the invention, the arrangement may thus work continuously or discontinuously, it is only important that a thermocompression of at least two layers is realized in order to obtain the first and second overlapping areas mentioned beforehand with their properties according to the invention.

An embodiment provides that the arrangement for the continuous or discontinuous supply is designed in such a way that the water transport layer is fed between the two porous thermoplastic protection layers. This is the preferred variant; nevertheless, variations with a different number of layers, as already mentioned above, are possible, too.

An embodiment provides that the continuous supply is realized using coils. The water transfer layer and the thermoplastic protection layers, respectively, are available at a large industrial scale as a coil material. This way, it is easy to produce a water transfer compound in continuous form. As an alternative, blanks of the individual materials can be employed to be overlapped before the thermocompression in order to form the assembly. One embodiment of this alternative approach is realized in such a way that the respective blanks are covered with a peel-off film and stored before they are overlapped with each other.

It is to be emphasized that the thermocompression is only realized in areas, preferably in discrete areas, but that no full-face lamination takes place. The thermocompression of the discrete areas can for instance be realized using a frame-shaped stamp. As an alternative, thermocompression in the longitudinal direction and in the transverse direction—relative to the feeding direction of the coil-material—can be realized separately. To this end, it is preferred that the thermocompression in the longitudinal direction is realized as a continuous process using heated rolls, while the thermocompression in the transverse direction is realized as a discrete process using a single or several heated stamps. If several stamps, e.g. two stamps, are used, it is preferred that they are oriented essentially parallel to each other.

Thermocompression adjacent to the longitudinal edge of the material can be realized with the different layers being fed one upon the other with flat, open outer edges, where the edge of the water transfer layer may be flush with the edge of the porous thermoplastic protection layer(s) or extend beyond this edge or be distanced to this edge. Instead of leaving the outer edges of the layers flat and open, it is also possible that they form a kind of hem with at least one layer being folded around another one. It is preferred that this later embodiment is combined with the continuous process using thermocompression rolls. With a three-layer compound, an advantageous variant provides that both lateral outer edges of a first one of the porous thermoplastic protection layers are folded around the lateral outer edges of the water transfer layer and that in a consecutive step, the lateral outer edges of the second one of the porous thermoplastic protection layers are folded around the hem produced this way. On the one hand, it is possible that an intermediate thermocompression is realized with only two layers folded this way and that a second thermocompression step is realized once both foldings have been completed. This provides the advantage that the intermediate hem is flattened before the third layer is folded around. On the other hand, a single thermocompression step can be realized once the hemming has been completed.

An embodiment provides that the device additionally comprises a cutting arrangement for the cutting of the thermocompressed water transfer compound, in particular for the cutting of its edges as well as for the production of openings. This is advantageously realized using laser or by cutting or punching dies.

In this context it is possible but not required that the thermocompression and the cutting of the openings and/or the cutting of the edges is realized in a single working station. In particular with a combined tooling setup, the thermocompression with a simultaneous cutting using a punching die or cutting knives can have advantages as the sequence of the process is optimized.

An embodiment provides that the assembly device additionally comprises a stacking arrangement, which is designed for the stacking of the water transfer compound and of the flow plates in a predetermined order. The water transfer compound and the flow plates may have the same size or a different one. This way, the corresponding stacks may "grow". The supply of the flow plates may for instance be realized laterally using suited robot arms. Doing so, the supply of the water transfer compound is considerably facilitated compared to a supply of the individual layers. In addition to a reduction of the amount of parts to be handled, the gripping and positioning is facilitated as the gas tightness of the water transfer layer enables the water transfer compound to be caught by a vacuum gripper without a negative impact resulting from the porosity of the thermoplastic protection layer.

A particular design of this assembly device comprises at least the following arrangements:

a) an arrangement comprising a coil feed for a continuous supply for the water transfer layer as well as for the overlying and the subjacent porous thermoplastic protection layers as starting products for forming a water transfer compound in continuous form, b) an arrangement for thermocompression of the water transfer compound having continuous form, c) an arrangement for the production of openings in the water transfer compound having continuous form, d) an arrangement for stacking of flow plates below the water transfer compound having continuous form as well as for separating individual sections of the water transfer compound having continuous form for forming humidifier modules and/or stacks of humidifier modules by connection of the separated sections of the water transfer compound with subjacent flow plates.

In this context, it is advantageous that a continuous process at large industrial scale can be realized. It is particularly advantageous that even the left over material, thus the sections of water transfer compound not used in the stack of humidifier modules, can be continuously rolled up at the end of the assembly device and therefore be disposed of or recycled in a facilitated manner. With respect to this roll to roll arrangement, it is further advantageous that the foil which is prone to be folded or bent can be easily tensioned so that the blanks cut from the water transfer compound having continuous form can be connected to the flow plates while being under tension. This is particularly true for the water transfer layer, but applies to the thermoplastic protection layers, too. Therefore, a bending or wrinkling can be avoided which is particularly advantageous for the leak tightness of the humidifier to be produced.

Another advantageous design of this assembly device comprises at least the following arrangements:

a) an arrangement comprising a coil feed for a continuous supply for the water transfer layer as well as for the overlying and the subjacent porous thermoplastic protection layers as starting products for forming a water transfer compound in continuous form, b) an arrangement for thermocompression of the water transfer compound having continuous form, c) an arrangement for cutting the outer contour of the water transfer compound and optionally for the production of openings in the water transfer compound, d) an arrangement for the transfer of separated sections for the water transfer compound and e) an arrangement which may be spatially separated from the other arrangements for stacking of flow plates below and/or above the separated sections of the water transfer compound for forming humidifier modules or stacks humidifier modules respectively, by connecting separated sections of the water transfer compound with overlying and/or subjacent flow plates.

Here, it is possible, too, to wind up the left over material after the cutting of the outer edges and to maintain the different conveying paths of material under tension. Given the gas tightness of the water transfer layer, the separated sections of the water transfer compound can be easily removed from the cutting station using a vacuum gripper and be either directly or indirectly transported to the stacking or connecting station for the humidifier modules. With an indirect transfer, the separated sections of the water transfer compound are advantageously collected in a large number and later on, this collection of ready-made water transfer compounds is fed to a stacking- or connecting station which is advantageously spatially separated from the other stations.

A possible variant provides that the individual materials diffusion medium, membrane and diffusion medium, which is the same as the thermoplastic protection layer, the water transfer layer and the other thermoplastic protection layer mentioned above, are fed from a coil of the device and are positioned one above the other in parallel. A hot stamp or coining roll acting from one or both sides welds the compound in the edge region facially and gas tight. Doing so, the thermoplastic diffusion medium is melted and compressed and in this way, the porosity of these layers is eliminated in the regions treated, thus in the welded areas. In the end, a flat, mainly smooth edge structure results which fixes the membrane located in the center of the compound. Moreover, the edge structure becomes adhesively bonded to the membrane and therefore protects the fragile membrane from mechanical stress. In addition, an ideal area for the sealing of the membrane or for the application of a gluing to the flow, plate is formed. Prior to mounting of the compound to the flow plate, the contour of the compound is tailored so that it fits the flow plate by removing parts of its outer edge. This can for instance be done by cutting out, punching out or using laser. Forming of the contour can be realized e.g. directly on the vacuum gripper, or the compound is put down directly on the flow plate and connected to the latter. In the latter case, the desired contour of the compound is cut directly on the plate. The sealing connection towards the flow plate can either be realized using a gasket or using a gluing, or the compound is directly molten or welded to the flow plate. As the water transfer compound is already gas tight in its edge region, the positioning of the transfer compound relative to the flow plate is considerably facilitated and, therefore, misalignments or leakages can be better excluded. Mounting of alternatingly repeating layers is facilitated and becomes faster and more cost-efficient.

In many humidifier stacks, the sealing areas on both sides of a water transfer compound are not aligned. They rather show an alternating arrangement with a sequence flow plate—interface 1—water transfer compound—interface 1—flow plate—interface 2—water transfer compound—interface 2—flow plate . . . where the sealing areas at interface 1 are shifted relative to the sealing areas at interface 2 when both interfaces are projected into a common plane. In this situation, the contour of the membrane is generally different whether it is applied at two interfaces 1 or at two interfaces 2. With such a configuration it is advantageous to realize the thermocompression with a larger width than would be required for the smaller one of both contours and to subsequently cut out the required contour within the thermocompressed area. As already mentioned, this can be realized with high speed, precision and flexibility using laser cutting.

BRIEF DESCRIPTION OF THE DRAWINGS

The invention is now explained using several figures. It is to be noted that identical reference numbers in different figures denote similar elements even if these are not explicitly mentioned when discussing a figure. For additional information, the reader is referred to the list of reference numbers at the end of the specification. There are shown in

|
FIGS. 3a to 3f: | Details of embodiments of water transfer compounds according to the invention; |
|
FIG. 4: | A humidifier module in exploded view; |
|
FIG. 5a to 5d: | Optional details of a production device according to the invention; |
|
FIGS. 6a and 6b: | Exemplary views of embodiments of water transfer compounds according to the invention; |
|

DETAILED DESCRIPTION OF THE INVENTION

Figure 1A:
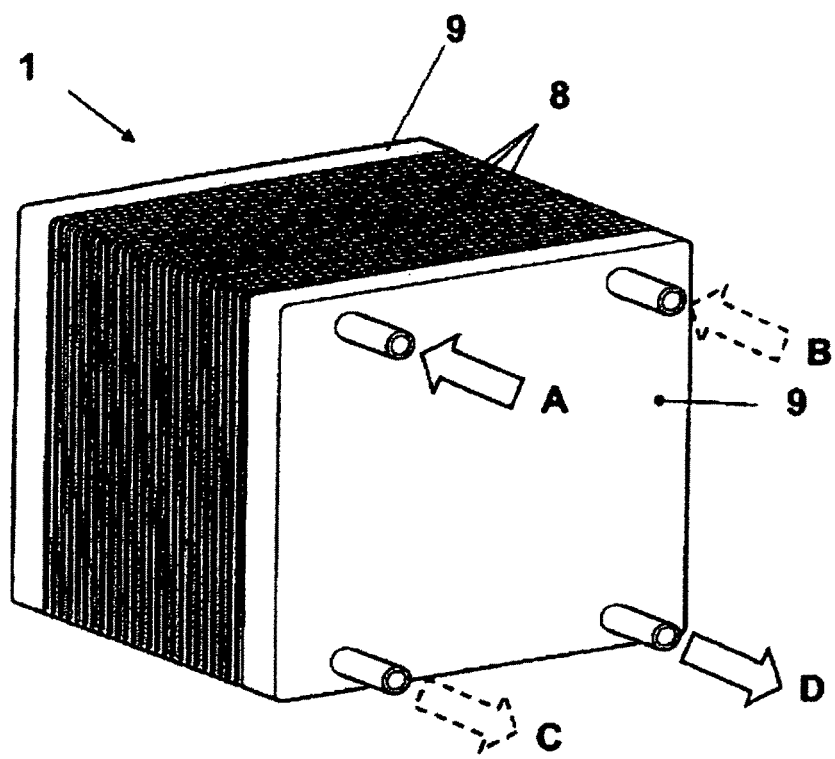
FIGS. 1a and 1b: | A humidifier according to the invention; |
| --- | --- |
|
Figure 1B:
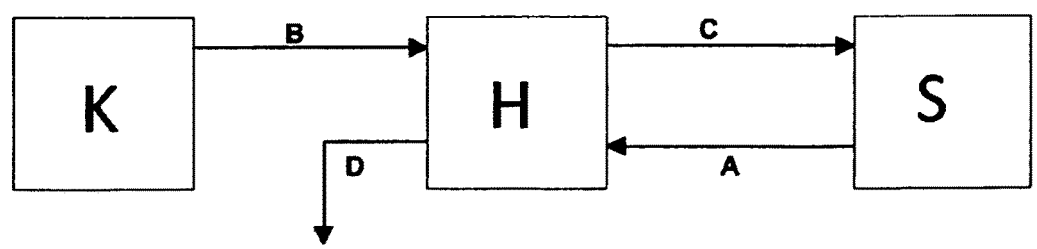

FIG. 1a shows a humidifier 1 which comprises a plurality of layered humidifier modules 8, which are stacked and compressed between two end plates 9. Gases are fed and discharged through the end plates. The humidifier 1 is thus a humidifier for the humidification of process gas for fuel cells, comprising a first inlet for feeding dry gases (arrow B) as well as a first outlet for discharging humidifier gases (arrow C) and a first inlet for feeding humid gases (arrow A) as well as a second outlet for discharging dehumidified gases (arrow D). FIG. 1b schematically shows the entire construction, where dry process gas is fed from a compressor K via a feeding line B to the humidifier H and as a humidified gas via the outlet C fed to the fuel cell stack S. The humid gas which is released from the fuel cell stack S is fed to the humidifier H via a feeding line A, there it releases an essential part of its humidity to the dry gas fed via feeding line B from the compressor K. The dehumidified gas leaves the humidifier H via the outlet D.

Figure 2A:
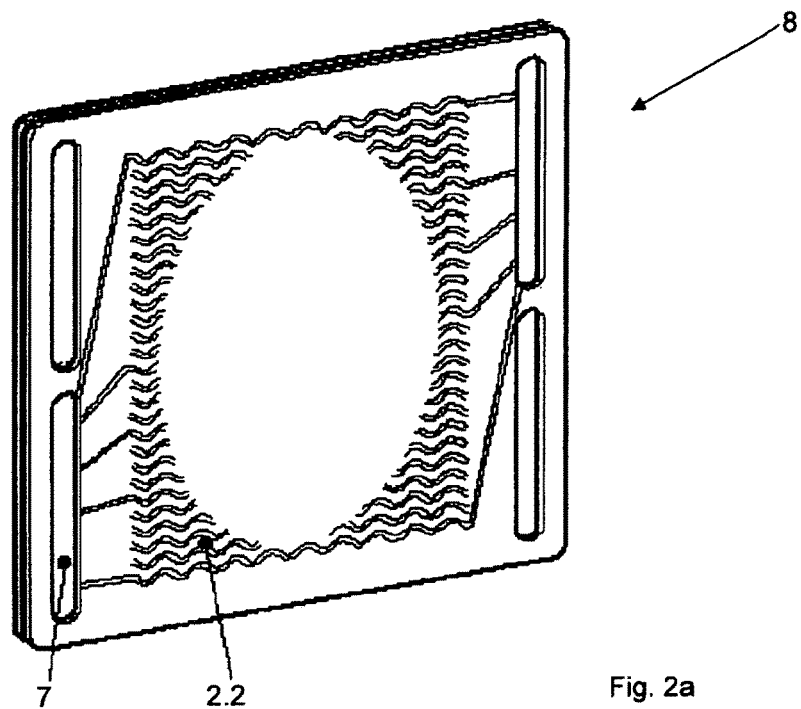
FIGS. 2a and 2b: | Details of a humidifier module consisting in two flow plates and a water transfer compound according to the invention being arranged between the two flow plates; |
|

FIG. 2a shows a humidifier module 8. Several of these humidifier modules 8 in layered form are stacked in the humidifier shown in FIG. 1.

The humidifier module 8 again shows several layers; in the following, this is further explained using the exploded view in FIG. 2b. In contrast, on the front side of FIG. 2a only the second flow plate 2.2 can be identified.

Figure 2B:
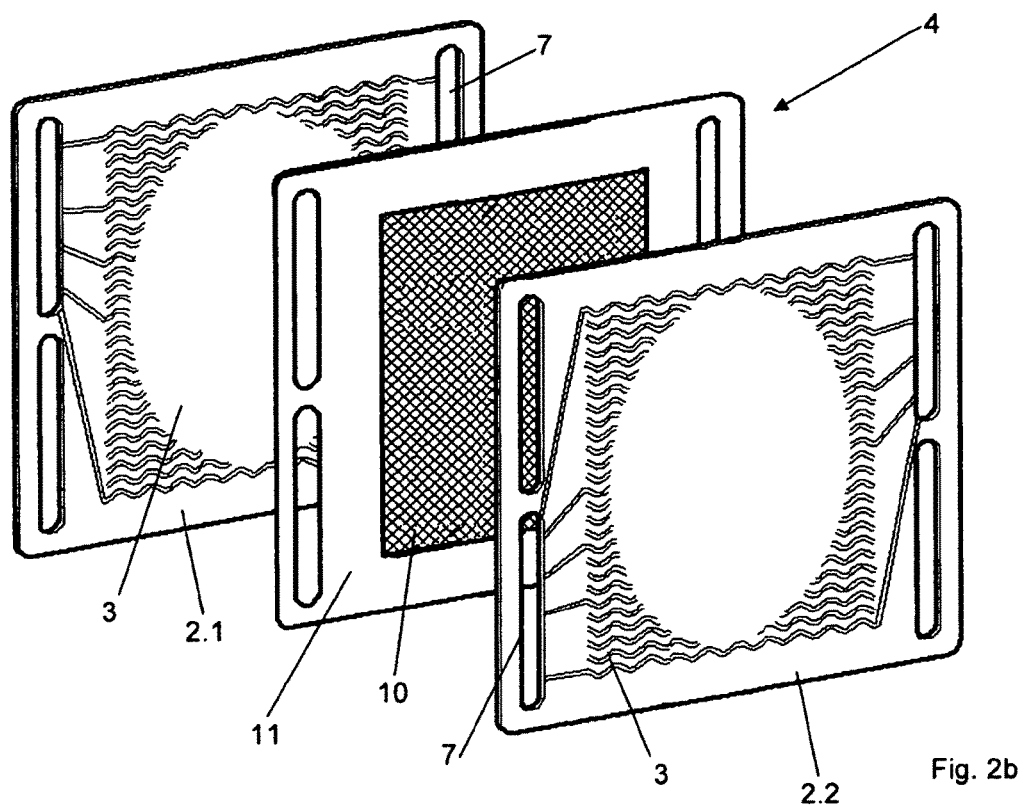

FIG. 2b shows the humidifier module 8 given in FIG. 2a in an exploded view.

At the center, a water transfer compound 4 is shown which is arranged between a first flow plate 2.1 and a second flow plate 2.2. On the water transfer compound 4, a porous area of a thermoplastic protection layer is indicated with a crosshatching; the surrounding area is not porous, so that there no gas passage is possible. Details of this arrangement will be explained in detail in the context of FIG. 3a and the figures following this figure. With respect to FIG. 2b, it is emphasized that the first as well as the second flow plates each show channel structures 3 for the guidance of gases pointing towards the water transfer compound 4, where these channel structures are each connected via the openings 7 to one of the inlets A, B and one of the outlets C, D, respectively, which have been explained in the context of FIG. 1. This way, humid gas is guided towards the water transfer compound 4 or led away from the water transfer compound, respectively. The openings 7 in the flow plates and the water transfer compound 4, respectively are noteworthy, too; they are in certain areas aligned in the stack direction so that a transport of media transversely to the plane of the flow plates or the water transfer compound 4 can be realized. Both the shape and the amount of openings in FIG. 2b are only exemplary; other shapes are feasible, too and they are also not limited to the shapes shown in FIG. 3a and the consecutive figures.

Figure 3A:
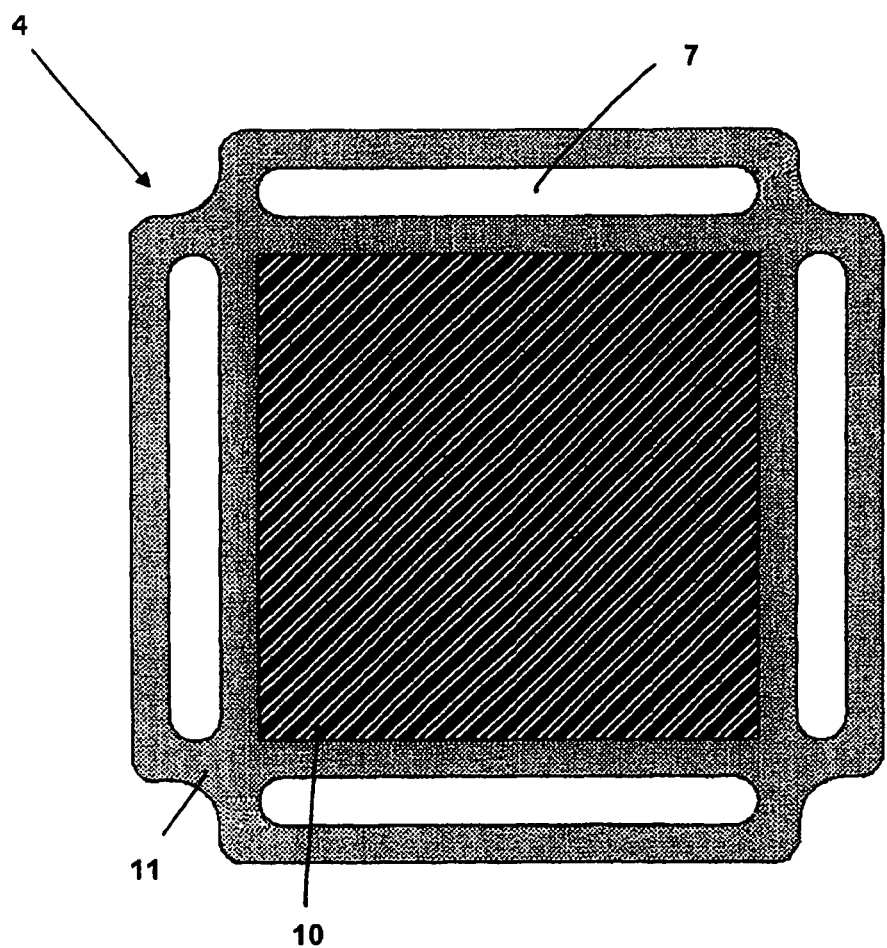
Figure 3B:
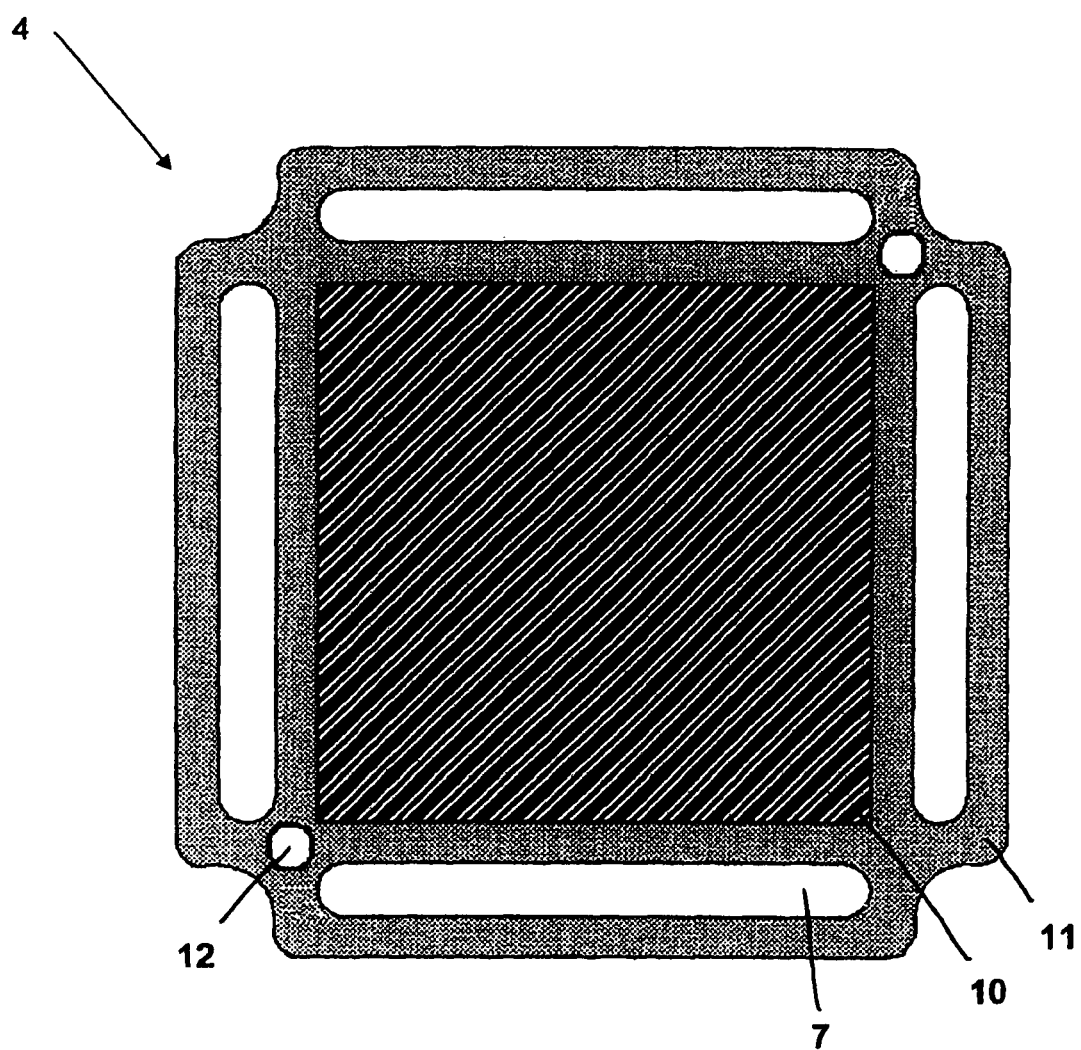

In the following, the water transfer compound 4 according to the invention is explained using FIGS. 3a to 3f. FIG. 3a shows a top view to a water transfer compound. FIG. 3b shows a corresponding top view, however, the water transfer compound 4 shown there additionally comprises positioning holes 12, which help in the positioning during the stacking of the water transfer compound 4 and the flow plates, 2.1 and/or 2.2, respectively. Therefore, in this configuration, all openings are aligned and a wrinkling or bending of the compound is prevented from to the largest extent resulting in the best possible gas tightness is achieved in the stack that is built up.

FIGS. 3c to 3f then show cross sections of the water transfer compound 4. FIGS. 3c and 3d show a detailed construction which mainly illustrates the compression state in the transition area of the thicknesses. In FIGS. 3e and 3f, the compression conditions have been chosen differently.

FIGS. 3a to 3f thus show a water transfer compound 4, preferably for the use in the humidification of process gases for fuel cells, comprising a water-permeable and essentially gas-tight water transfer layer 5 as well as at least one thermoplastic protection layer 6 which is water and gas permeable at least in sections. The water transfer layer 5 and the thermoplastic protection layer 6 overlap with each other at least in sections and comprise a first overlapping area 10 and a second overlapping area 11. The water transfer layer 5 in the first overlapping area 10 is accessible for humid gases through the thermoplastic protection layer 6 and the water transfer compound is thermocompressed in the second overlapping area 11, so that the water transfer layer 5 in the second overlapping area 11 is not accessible for humid gases through the compressed thermoplastic protection layer 6.

In FIGS. 3c to 3f it is obvious that the thermoplastic protection layers 6 are applied to both sides of the water transfer layer 5. Embodiments with a different number of layers are possible, too. In FIGS. 3c to 3f, one can identify that the second overlapping area 11 shows a reduced thickness compared to the first overlapping area 10. The largest thickness in the first overlapping area 10 is 200 μm, as is emphasized by double arrow d1 in FIG. 3c. The smallest thickness in the second overlapping area 11, indicated with double arrow d2, amounts to 80 μm. It is to be remarked that in particular in the transition area, as can be seen in FIG. 3c and especially in the detailed drawing in FIG. 3d, which shows the left section of FIG. 3c in detail, the thickness can range between these two values mentioned above. The thermoplastic protection layer 6 is porous in the first overlapping area 10, as is indicated for instance in FIGS. 3*c* to 3*f* in order to let humid gas. In the second overlapping area 11, this layer is essentially non-porous so that there no humid air can pass. The porosity in the first overlapping area 10 amounts to about 80%.

FIGS. 3*e* and 3*f* show other ratios of magnitude. The largest thickness dr in the first overlapping area 10 is about 250 μm. The smallest thickness d2' in the second overlapping area 11 amounts to 50 μm. The porosity in the first overlapping area 10 is higher than 90%.

The water transfer compounds shown in FIGS. 3*a* and 3*b* have a second overlapping area, which circumferentially surrounds the first overlapping area. As an alternative to this, it is however also possible that no surrounding enclosure is given, e.g. that the second overlapping area delimits the first overlapping area only at two longitudinal edges of the first overlapping area, as is shown in FIG. 6*a*. This is particularly advantageous for water transfer compounds in continuous form.

The embodiments according to FIGS. 3*a* to 3*f* further show that openings or passages 7 in the second overlapping area are cut out, punched out or laser-cut. These can be openings or passages with a surrounding edge, as is shown in FIGS. 3*a* and 3*b*. It is however also possible that the outer contour of the compound is cut out, punched out and/or laser-cut from the second overlapping area at least in sections.

As to the choice of the material of the water transfer layer or of the thermoplastic protective layer, a vast variety of materials is possible. In the present example, the water transfer layer is realized as an ionomer membrane, the porous thermoplastic protection layer is made from polypropylene.

FIG. 4 shows an exploded view of a humidifier module 8 in a lateral perspective. In FIG. 4, the flow plates 2.1, 2.2 are each only shown with their surface pointing towards the water transfer compound 4 and thus to the channel structures 3 extending in this surface. The opposite surfaces which are shown with a smooth surface can comprise a diversity of possible structures, e.g. with an essentially mirror-symmetric structure to the surface shown. However, for clarity reasons, no explicit illustration of this surface structure is given.

In the mounted state, as is for instance shown schematically in FIG. 2*a*, the water transfer compound 4 is adhesively bonded to the first and/or second flow plate at least in sections. In FIG. 4, the analogous situation can be found with flow plates 2.1 and 2.2. Here, the adhesive connection is situated in the outer edge area of the first flow plate 2.1 and of the second flow plate 2.2. In FIG. 4, in the contact area between the first flow plate 2.1 and the second overlapping area as well as between a second flow plate 2.2 and the second overlapping area, an additional material 30 is indicated. This material is for instance an adhesive or a meltable material which can then form an adhesive connection to the second overlapping area 11.

It is however also possible that 30 only represents a sealing material and that the sealing effect desired for is achieved by force fit.

The humidifier module 8 shown in FIG. 4 in addition has first and second flow plates 2.1 and 2.2 with passage openings 7 for the guidance of media in the stack direction, where these openings overlap at least in sections with the openings of the second overlapping area of the water transfer compound 4, as can be seen in FIG. 4. From these passage openings 7, media are fed via the passages 27 extending in parallel to the plane of the plate to the respective channel structures 3.

The flow plates 2.1 and 2.2 are made from plastics, to be more precise from fiber-reinforced polyamide. It is however also possible to use corrosion-stable metallic materials.

One can further see that the first overlapping area of the water transfer compound 4 overlaps with the channel structures 3 of the first and the second flow plate at least in sections.

The first and the second flow plates here have different designs; they are different from each other with respect to the arrangement of the feeding lines 27 towards the channel structures. Such feeding lines 27 are also given in the plate 2.2 but not in the section shown. In general, these flow plates can also differ with respect to the choice of material, the form of the channels, the direction of the channels and/or the sealing contour.

The humidifier modules 8 shown in FIG. 2*a* are arranged in a stacked form, as mentioned earlier, in the context of FIG. 1*a*. It is possible that the flow plate 2.1 has a geometry A and that the flow plate 2.2 has a geometry B, that the sequence of these flow plates is A-B-A-B and that the flow plates 2.1 and 2.2 also have channel structures on their respective opposite surfaces and that each single water transfer compound 4 is arranged between the flow plates on the surfaces provided with channel structures 3.

In the following, the production of a water transfer compound, of a humidifier module and of a humidifier, respectively, is discussed. It will be explained in the following. However, it is to be emphasized that with this all details of the production method are disclosed and that herewith not only the device for the production, but also its way of functioning, thus also the method for the production, can be distinctively derived.

Figure 5A:
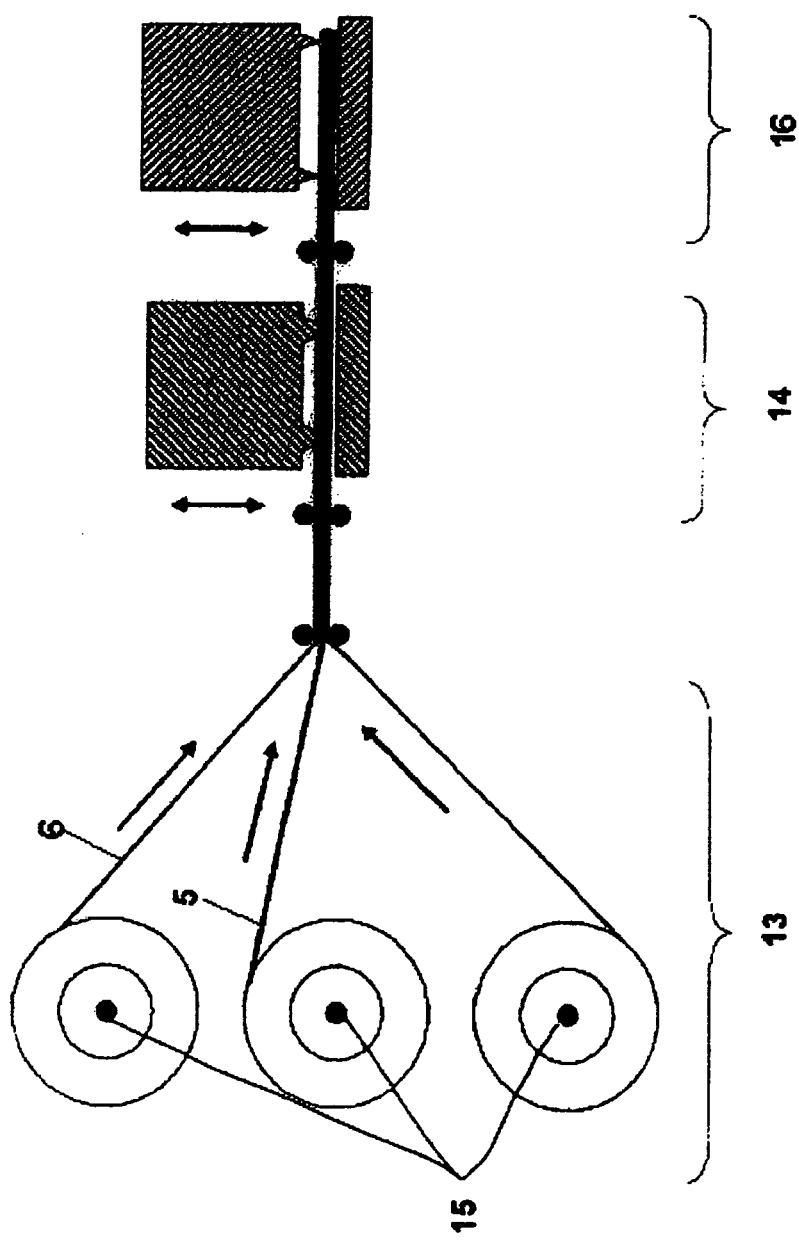

FIG. 5*a* shows an arrangement 13 for a continuous supply of a water transfer layer, here from the middle coil 15 and of at least one porous thermoplastic layer 6, here from the upper and the lower coil in FIG. 5*a* as well as an arrangement 14 for an at least partial thermocompression of the water transfer layer and the at least one thermoplastic protection layer. The thermocompression is realized in such a way that the compressed areas become water and gas tight. In the embodiment shown in FIG. 5*a*, the thermocompression is performed along two lands of a hot compression stamp, so that for instance the embodiment of a water transfer compound 4 in continuous form shown in FIG. 6*a* results. In FIG. 5*a*, the thermocompression is followed by a cutting arrangement 16. With this arrangement, a separation of the compound into blanks 19 is possible; the cutting line for instance extends, as is shown in FIG. 6*a*, along the center lines, which divide the second overlapping areas horizontally.

Figure 5B:
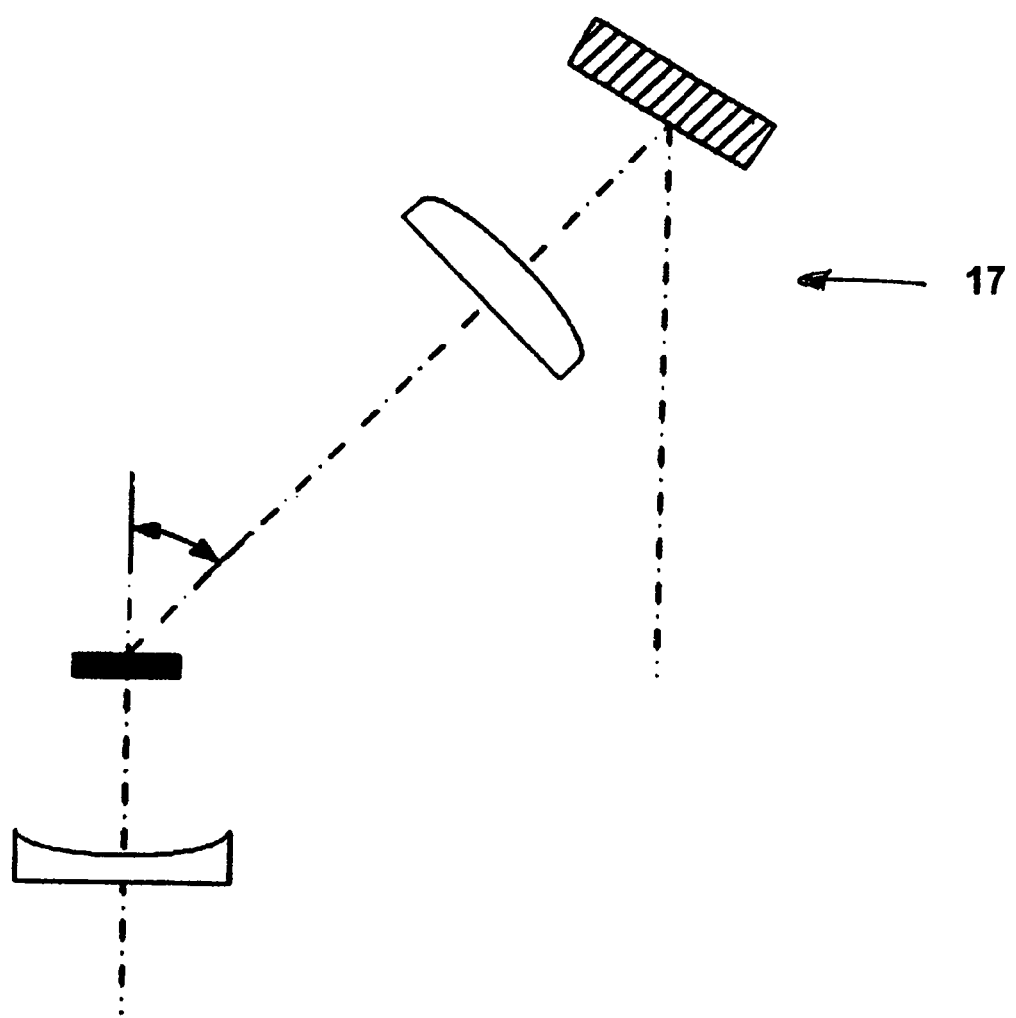

FIG. 5*b* schematically shows a laser arrangement with a deflection mirror. With this arrangement, a cutting of the water transfer compound 4 is possible, for instance a reshaping of the edge or the realization of passage openings.

FIG. 5*c* shows a corresponding variant of FIG. 5*a*, here a laser tool is used as the arrangement for laser-cutting 16 instead of the punching/cutting arrangement in FIG. 5*a*.

FIG. 5*d* shows a further arrangement, which resembles the one of FIG. 5*a*. However, here the arrangement for thermocompression 14 and the arrangement 16 are realized in a single working station, both arrangements can however be controlled independent of each other.

FIGS. 6*a* and 6*b* again show examples of water transfer compounds 4. In FIG. 6*a*, the first overlapping area 10 is not completely encircled by the second overlapping area 11, while in FIG. 6b the first overlapping area 10 is completely surrounded by the second overlapping area 11.

Finally, FIG. 7 again shows two variants of a complete production process, with arrangements 13, 14 and 16 according to FIG. 5d.

Figure 7A:
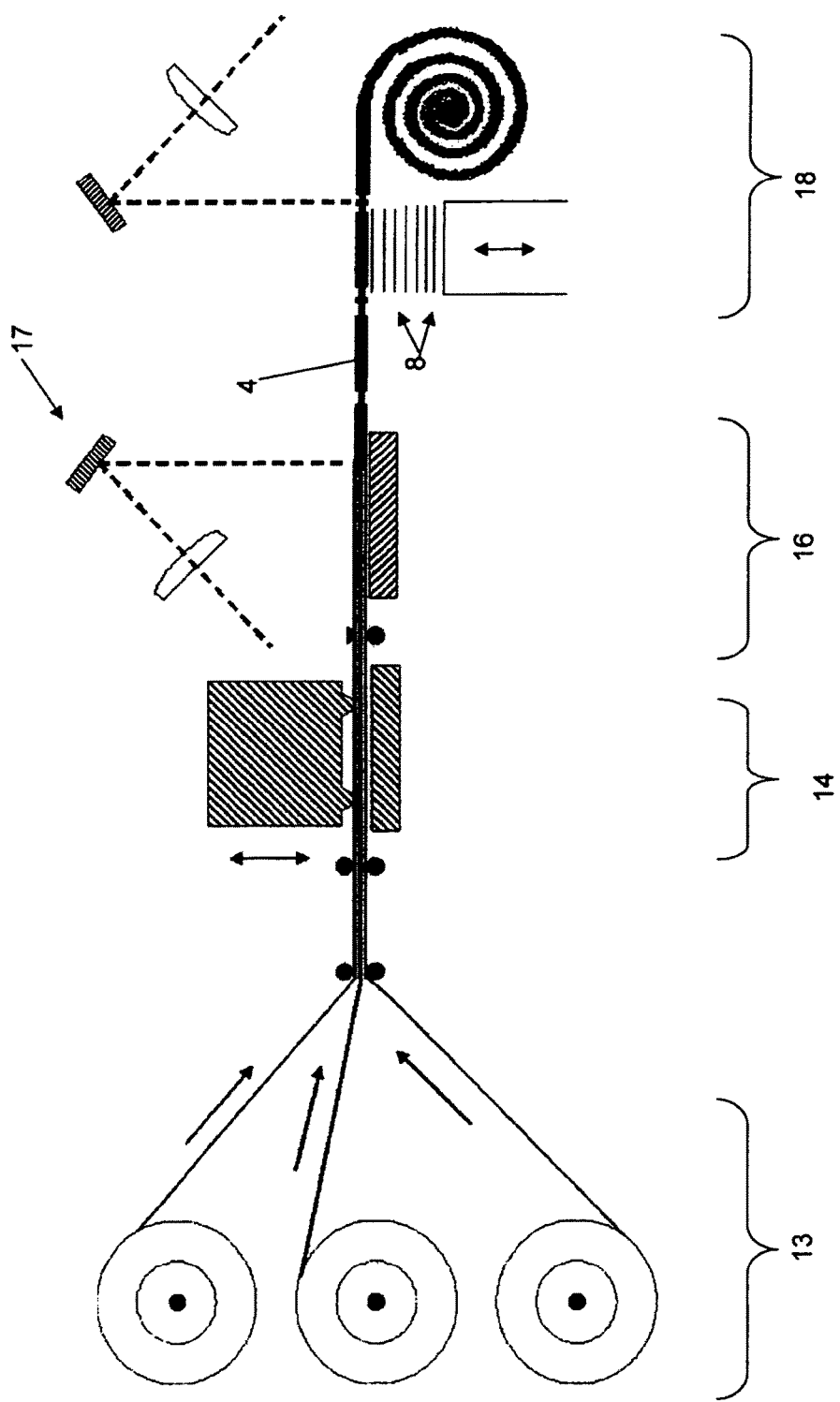
FIGS. 7a and 7b: | Two exemplary procedures for the production of a humidifier; |
| FIGS. 8a and 8b | Alternative designs of the edges of water transfer compounds according to the invention; |
| FIGS. 9a to 9d | A further alternative design of the outer edge of a water transfer compound according to the invention in three intermediate state and in the final state of the production process; and |
| FIG. 10 | An exemplary alternative procedure for the production of a humidifier. |

In addition, in the embodiment of FIG. 7a, an arrangement for the stacking of humidifier modules or of flow plates 2.1 and 2.2 is shown which immediately follows the arrangements illustrated beforehand. This additional arrangement for stacking among others comprises a lifting table, which is indicated with a double arrow from bottom to top. Further in the area of the arrangement 18, an arrangement for laser cutting or laser melting is given. The supply of the flow plates 2.1 and 2.2 is realized by a robot which is not shown here; the feeding is realized below the water transfer compound in continuous form which is maintained under tension. On the right hand side in FIG. 7a, a coil with left-overs of the water transfer compound after cutting out of the blanks is shown. These left-overs have continuous form, too. In the arrangement 18 shown in FIG. 7, the blanks for the humidifier stack are cut from the continuous material of the water transfer compound in such a way that the second overlapping area 11 completely surrounds the first overlapping area 10. Therefore, the continuous material of the water transfer compound is not completely divided into segments. As a consequence, a mechanical tension can be established between the three coils shown on the left-hand side and the coil on the right-hand side. Therefore, the facial material can be tensioned smooth in order to achieve an optimal facial orientation relative to the subjacent flow plates with which they are connected completely plane.

Figure 7B:
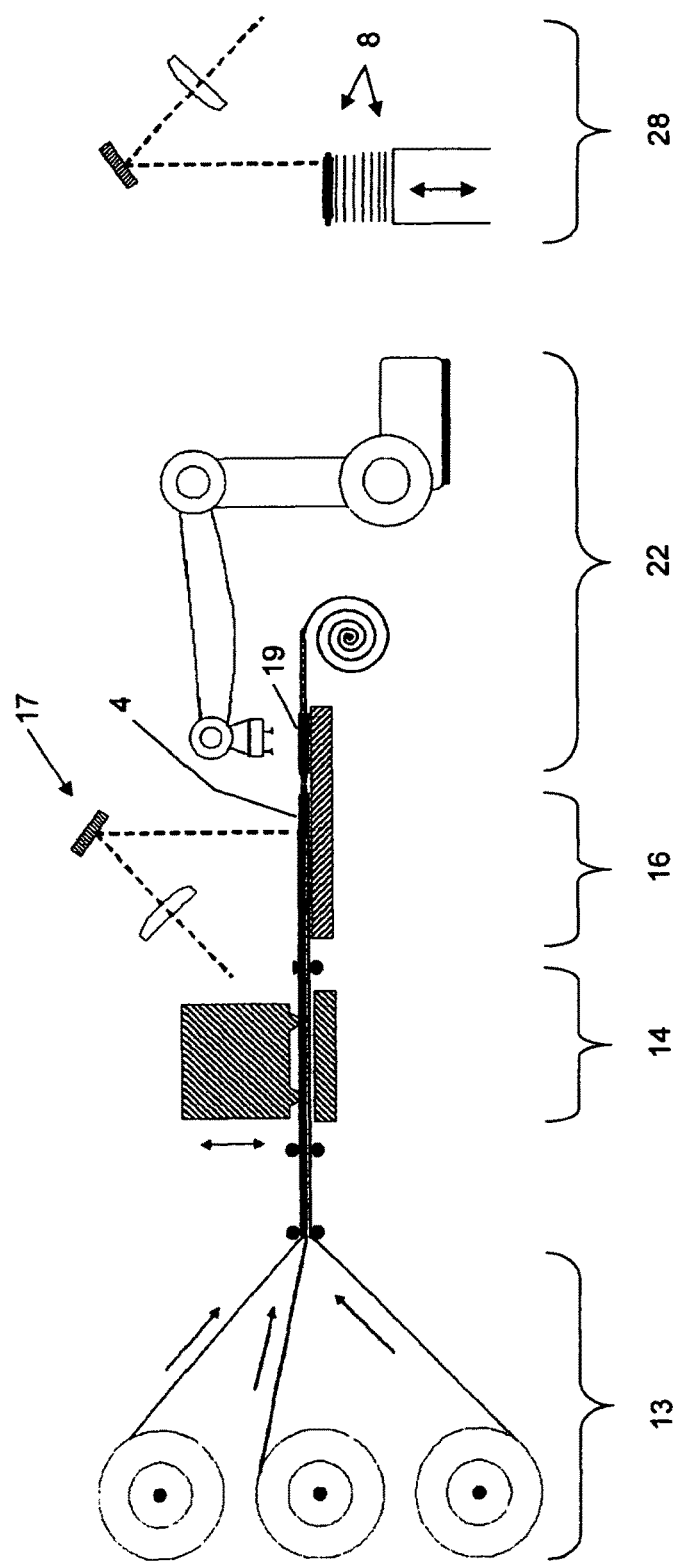

FIG. 7b varies the arrangement for the production process in such a way that the separated blanks 19 of the water transfer compound 4 are first taken up with a vacuum gripper 22, in order to be connected to the flow plates in a spatially divided working station 28 to form humidifier modules.

Figure 8A:
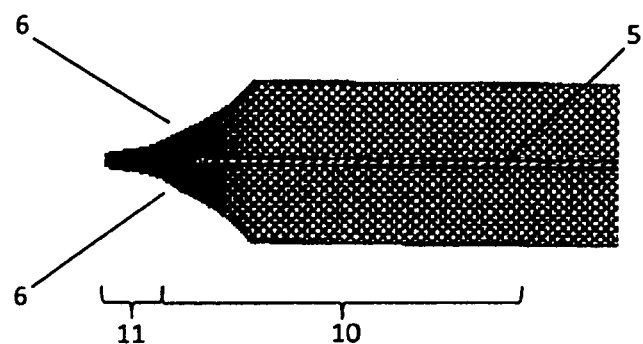
Figure 8B:
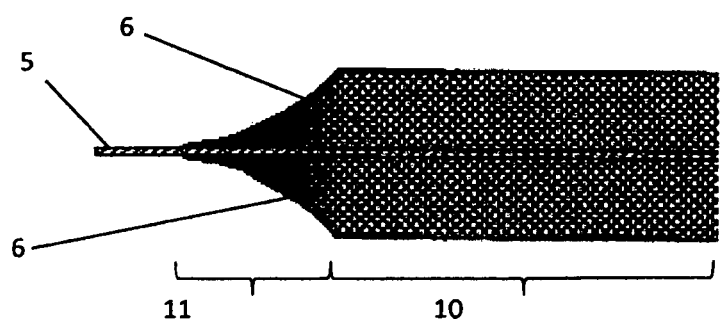

FIGS. 8a and 8b show alternative designs of the edges of water transfer compounds 4 according to the invention. It becomes obvious that the outer edges of the water transfer layer 5 and of the thermoplastic protection layer 6 do not have to be flush as in the examples of FIGS. 3 and 4, but that it is both possible that the water transfer layer 5 extends beyond the outer edge of the thermoplastic protection layer 6 or that the outer edge of the water transfer layer 5 does not reach as far as the outer edge of the thermoplastic protection layer 6. While the first option provides enhanced sealing properties, the latter option allows for reduction in material use of the typically more expensive water transfer layer 5.

Figure 9A:
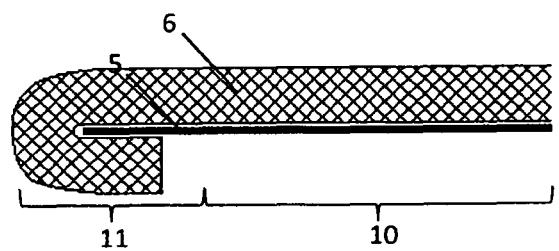
Figure 9B:
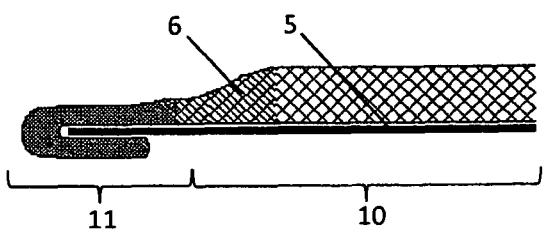
Figure 9C:
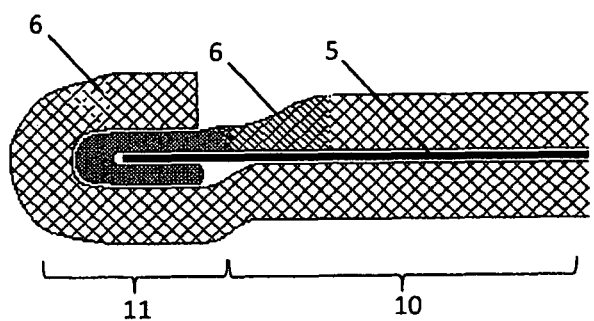
Figure 9D:
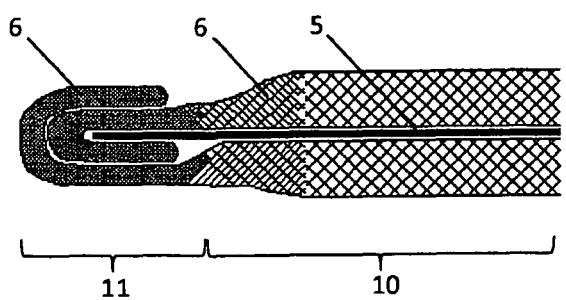

In FIGS. 9a to 9d, another design of the outer edge of a water transfer compound 4 according to the invention is explained. FIGS. 9a, 9b and 9c show intermediate production steps. In the first step, the outer edge of a first thermoplastic protection layer 6 is folded around the outer edge of the water transfer layer 5 in order to form a kind of hem. In the next step, shown in FIG. 9b, the three-layered outer edge area is thermocompressed to form a stable and leak tight outer edge which facilitates the next step. In this subsequent step, the outer edge of a second thermoplastic protection layer 6 is folded around the outer edge of the already thermocompressed outer edge formed from the first thermoplastic protection layer 6 and the water transfer layer 5, see FIG. 9c. In the last step, this second three-layered outer edge area is again thermocompressed in order to provide for an outer edge region with excellent stability and further improved leak tightness. In principle, these four steps can be realized on all four outer edges of the water transfer compound 4. It is however preferred that it is realized on two edges only which extend in the feeding direction of the layers. In this respect, it is most preferred that the thermocompression is realized in a continuous process using heated rolls.

Figure 10:
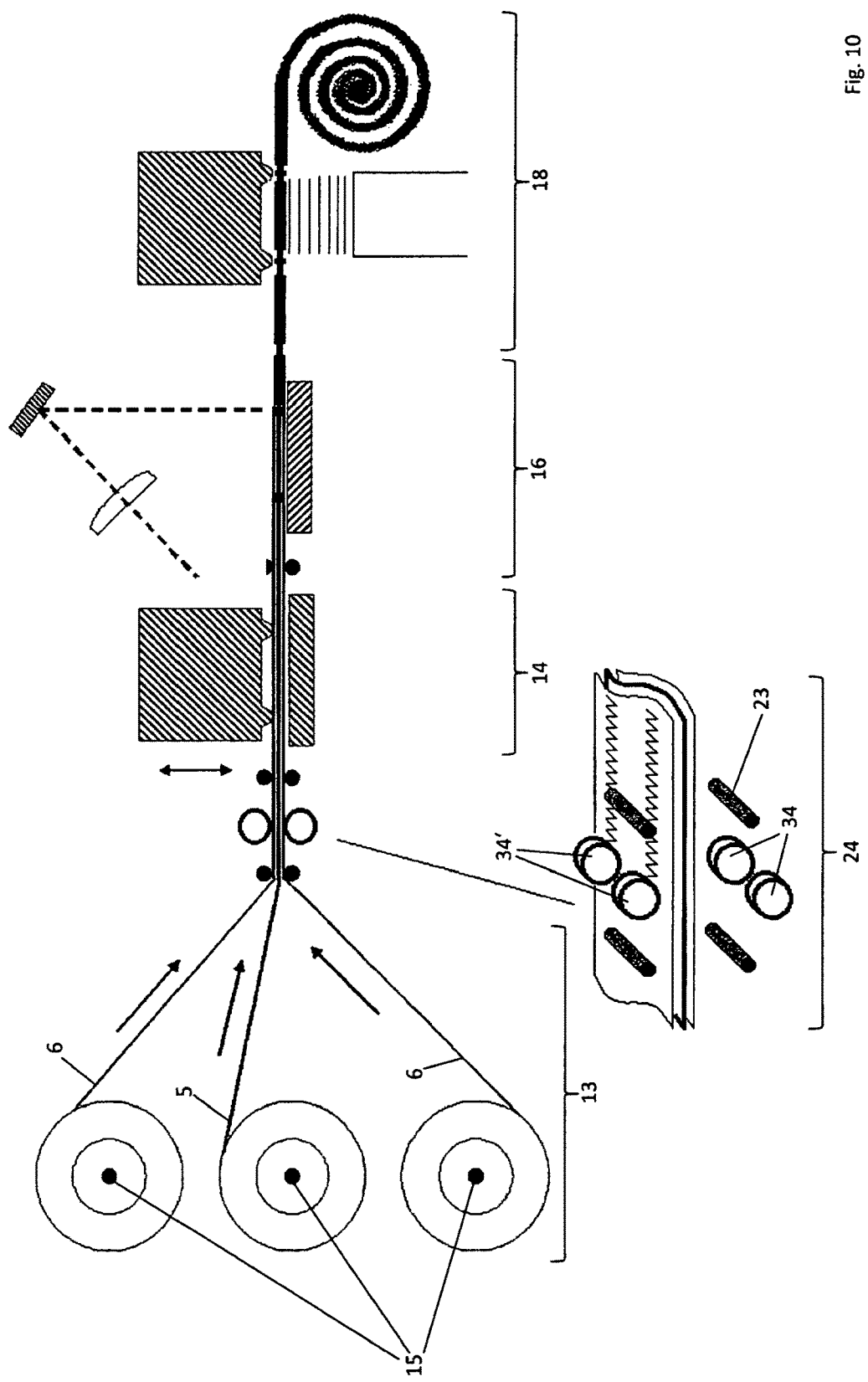

FIG. 10 illustrates an exemplary alternative procedure and production arrangement for the production of a humidifier. The arrangement 13 for the continuous supply of the water transfer layer 5e from the middle coil 15 and of the porous thermoplastic layers 6 is realized as in the example of FIG. 5a. However, the thermocompression is achieved here in two steps. The lateral outer edges of the water transfer compound are thermocompressed using heated rolls 34, 34' at both lateral edges in working station 24. To this end, the layers are fed using guiding rolls 23. Only subsequently, thermocompression of the water transfer layer and the thermoplastic protection layers in a transverse direction is realized in an arrangement 14. The subsequent working stations 16, 18 correspond to the ones given in the example of FIG. 7a.

LIST OF REFERENCE NUMBERS

1; H humidifier
2.1 first flow plate
2.2 second flow plate
3 channel structures
4 water transfer compound
5 water transfer layer
6 thermoplastic protection layer
7 opening
8 humidifier module
9 endplate
10 first overlapping area
11 second overlapping area
12 positioning hole
13 arrangement for continuous or discontinuous feed
14 arrangement for thermocompression
15 coil
16 cutting arrangement
17 cutting using laser
18 stacking arrangement
19 sections of the water transfer compound
22 vacuum gripper
23 guiding rolls
24 working station for thermocompression
27 supply lines to the channel structures
28 spatially separated working station
30 additional material, gluing and/or sealing
34, 34' heated rolls
A second inlet for the supply of humid gases
B first inlet for the supply of dried gases
C first outlet for the release of humidified gases
D second outlet for the release of dehumidified gases
K compressor
S fuel cell stack
d1, d2 thickness

The invention claimed is:

1. A method of production of a water transfer compound comprising:
continuously or discontinuously supplying a water transfer layer and at least one porous thermoplastic protection layer to create first and second overlapping sections of the compound, wherein the first overlapping section is porous for water and gas permeability and
at least sectional thermocompressing of the water transfer layer and the at least one thermoplastic protection layer in the second overlapping section of the compound, with the thermocompression being realized in such a way that the compressed areas are water and gas tight.

2. The method according to claim 1, wherein the continuous or discontinuous supply is achieved by feeding the water transfer layer between two thermoplastic protection layers.

3. The method according to claim 1, wherein the continuous supply is realized using coils.

4. The method according to claim 3, wherein the discontinuous supply is realized as a supply of blanks cut from the coils.

5. The method according to claim 1, further comprising cutting the thermocompressed water transfer compound.

6. The method according to claim 5, wherein edges of the compound are cut and openings are produced in the compound by cutting.

7. The method according to claim 5, wherein the cutting is by using a laser or by punching.

8. The method according to claim 6, wherein thermocompression and cutting-out of openings and/or cutting the edges are accomplished in a single workstation.

9. The method according to claim 1, further comprising stacking at least one of said water transfer compound and at least two flow plates of identical or different size in a predetermined order.

10. The method according to claim 1, further comprising at least:
   a) continuously supplying the water transfer layer as well as the at least one thermoplastic protection layer as starting products for forming a water transfer compound in continuous form,
   b) thermocompression of the water transfer compound having a continuous form,
   c) producing openings in the water transfer compound having continuous form,
   d) stacking of flow plates below the water transfer compound having continuous form as well as separating individual sections of the water transfer compound having continuous form for forming humidifier modules and/or stacks of humidifier modules by connecting the separated sections of the water transfer compound with subjacent flow plates.

11. The method according to claim 1, comprising at least:
   a) continuously supplying the water transfer layer as well as the at least one thermoplastic protection layer as starting products for forming a water transfer compound in a continuous form,
   b) thermocompression of the water transfer compound having a continuous form,
   c) cutting an outer contour of the water transfer compound and optionally producing openings in the water transfer compound,
   d) transferring separated sections for the water transfer compound and
   e) stacking of flow plates below and/or above the separated sections of the water transfer compound for forming humidifier modules or stacks of humidifier modules respectively, by connecting separated sections of the water transfer compound with overlying and/or subjacent flow plates.

* * * * *